US011025608B2

(12) United States Patent
Friel et al.

(10) Patent No.: US 11,025,608 B2
(45) Date of Patent: Jun. 1, 2021

(54) ENABLING ZERO-TOUCH BOOTSTRAP FOR DEVICES ACROSS NETWORK PERIMETER FIREWALLS

(71) Applicant: Cisco Technology, Inc., San Jose, CA (US)

(72) Inventors: Owen Brendan Friel, Salthill (IE); Max Pritikin, Boulder, CO (US); Cullen Jennings, Calgary (CA); Richard Lee Barnes, II, Arlington, VA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 237 days.

(21) Appl. No.: 15/946,003

(22) Filed: Apr. 5, 2018

(65) Prior Publication Data

US 2019/0149538 A1 May 16, 2019

Related U.S. Application Data

(60) Provisional application No. 62/584,168, filed on Nov. 10, 2017.

(51) Int. Cl.
*H04L 29/06* (2006.01)
*H04W 12/069* (2021.01)
(Continued)

(52) U.S. Cl.
CPC ...... *H04L 63/0823* (2013.01); *H04L 63/0281* (2013.01); *H04L 63/168* (2013.01);
(Continued)

(58) Field of Classification Search
CPC ............. H04L 63/0823; H04L 63/0281; H04L 63/168; H04L 63/166; H04L 41/0806;
(Continued)

(56) References Cited

U.S. PATENT DOCUMENTS

| 2009/0165099 A1* | 6/2009 | Eldar | H04L 41/0806 |
| | | | 726/5 |
| 2011/0154024 A1* | 6/2011 | Ignaci | H04L 63/0823 |
| | | | 713/156 |

(Continued)

OTHER PUBLICATIONS

Pascal Urien, "Introducing High Level API for TLS Dual Stack, Based on TLS Smart Cards", Telecom ParisTech pp. 509-518 (Year: 2009).*

(Continued)

*Primary Examiner* — Michael Simitoski
*Assistant Examiner* — Hany S. Gadalla
(74) *Attorney, Agent, or Firm* — Edell, Shapiro & Finnan, LLC

(57) ABSTRACT

A method includes establishing an application layer transport layer security (ATLS) connection between a network device and a cloud server by sending, from the network device, TLS records in transport protocol (e.g., HTTP) message bodies to the cloud server, the ATLS connection transiting at least one transport layer security (TLS) proxy device, receiving, from the cloud server via the ATLS connection, an identifier for a certificate authority, establishing a connection with the certificate authority associated with the identifier and, in turn, receiving from the certificate authority credentials to access an application service different from the cloud server and the certificate authority, and connecting to the application service using the credentials received from the certificate authority.

18 Claims, 8 Drawing Sheets

(51) Int. Cl.
*H04W 12/0431* (2021.01)
*H04W 4/50* (2018.01)
*H04L 12/24* (2006.01)

(52) U.S. Cl.
CPC ..... *H04W 12/0431* (2021.01); *H04W 12/069* (2021.01); *H04L 41/0806* (2013.01); *H04L 63/166* (2013.01); *H04W 4/50* (2018.02)

(58) Field of Classification Search
CPC ....... H04W 12/0609; H04W 12/04031; H04W 4/50; H04W 12/069; H04W 12/0431
See application file for complete search history.

(56) References Cited

U.S. PATENT DOCUMENTS

| | | | | |
|---|---|---|---|---|
| 2013/0318343 | A1* | 11/2013 | Bjarnason | H04L 41/0809 713/157 |
| 2013/0325823 | A1* | 12/2013 | Resch | H04L 63/0823 707/695 |
| 2014/0223172 | A1* | 8/2014 | Meunier | H04L 9/321 713/156 |
| 2015/0020217 | A1* | 1/2015 | Gulbrandsen | G06F 21/6218 726/28 |
| 2016/0119287 | A1* | 4/2016 | Khazan | H04W 12/02 726/12 |
| 2016/0212148 | A1* | 7/2016 | Uzun | H04L 63/123 |
| 2016/0342429 | A1* | 11/2016 | Johansson | H04L 63/0823 |
| 2017/0289197 | A1* | 10/2017 | Mandyam | H04L 9/0825 |
| 2017/0352027 | A1* | 12/2017 | Zhang | H04L 9/0825 |
| 2017/0366547 | A1* | 12/2017 | Goldfarb | H04L 63/08 |

OTHER PUBLICATIONS

International Search Report and Written Opinion in counterpart International Application No. PCT/US2018/059150, dated Jan. 18, 2019, 12 pages.

O. Friel, et al., "Application-Layer TLS", draft-friel-tls-over-http-00, Network Working Group, Internet-Draft, ATLS, Oct. 2017, 20 pages.

M. Pritikin, et al., "Bootstrapping Remote Secure Key Infrastructures (BRSKI)", draft-ieff-anima-bootstrapping-keyinfra-07, ANIMA WG, Internet-Draft, BRSKI, Jul. 2017, 61 pages.

* cited by examiner

ENABLING ZERO-TOUCH BOOTSTRAP FOR DEVICES ACROSS NETWORK PERIMETER FIREWALLS

This application claims the benefit of U.S. Provisional Application No. 62/584,168, filed Nov. 10, 2017, which is incorporated in its entirety herein by reference.

TECHNICAL FIELD

The present disclosure relates to network security.

BACKGROUND

Provisioning and bootstrapping devices in a secure fashion on a secured network can be a difficult, time consuming, expensive and/or complex process. There are many different classes of devices such as collaboration endpoints (e.g., video endpoints and Internet Protocol (IP) Phones), and more generically Internet of Things (IoT) devices that depend on a cloud service to simplify bootstrapping and ongoing management. When these devices bootstrap they do not trust the local network; instead they attempt to establish a secured connection directly with a well-known cloud service via transport security protocols such as the Transport Layer Security (TLS) protocol.

Unfortunately, secured networks may deploy TLS interception proxy firewalls. These proxy firewalls insert themselves as a so-called Man-in-the-Middle (MITM) when the devices attempt to contact trusted cloud services beyond the local domain. Since the device likely does not trust the TLS interception proxy, the device may be prevented from establishing a secure connection to the cloud service, and thus precluded from successfully bootstrapping.

Further, not only may the interception proxies be widely deployed, but they may be infrequently updated. Their existence, and the ability to establish secure connections in spite of them, is a continued problem for a large class of devices.

DESCRIPTION OF EXAMPLE EMBODIMENTS

Overview

Figure 1:
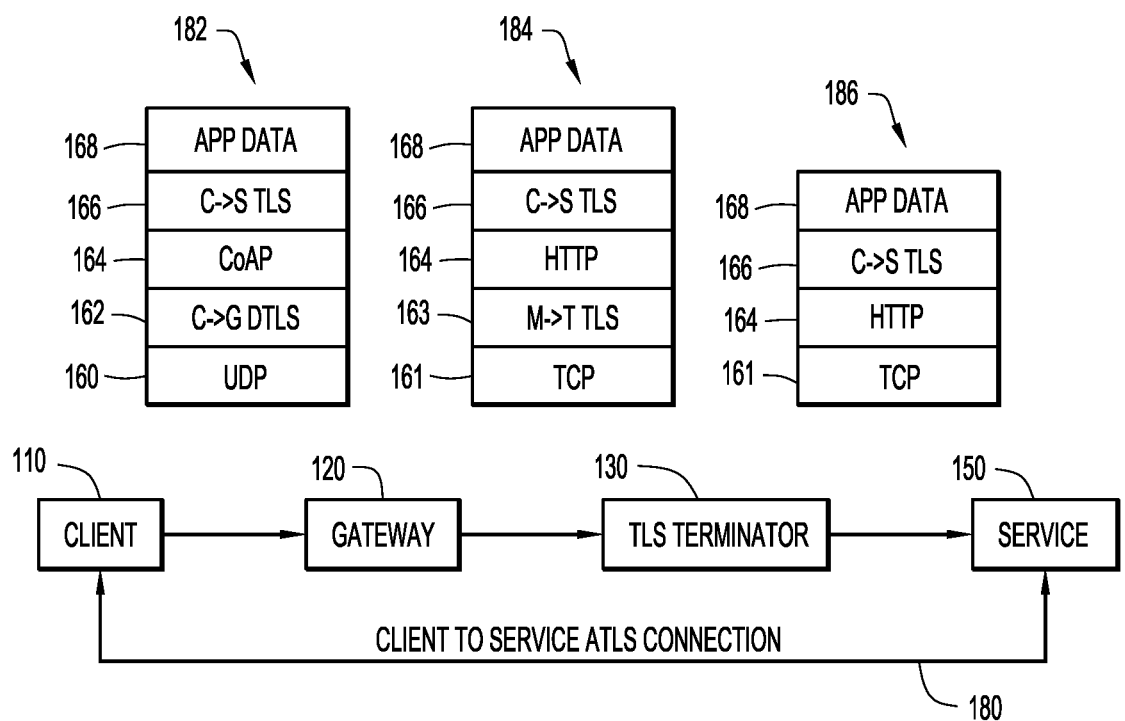
FIG. 1 depicts a network deployment of Application layer Transport Layer Security (ATLS), according to an example embodiment.

Presented herein are techniques that enable devices to establish a secure connection to a cloud service on the Internet even in the presence of an interception proxy, and to leverage that cloud service to perform a zero-touch secure bootstrap against a local domain. The techniques result in "zero-touch" bootstrapping once a device is powered up, even if the device is deployed on a secure network that intercepts all traffic to the Internet.

In accordance with one embodiment a method is provided including operations of establishing an application layer transport layer security (ATLS) connection between a network device and a cloud server by sending, from the network device, TLS records in transport protocol message bodies (e.g., HTTP message bodies) to the cloud server, the ATLS connection transiting at least one transport layer security (TLS) proxy device, receiving, from the cloud server via the ATLS connection, an identifier for a certificate authority, establishing a connection with the certificate authority associated with the identifier and, in turn, receiving from the certificate authority credentials to access an application service different from the cloud server and the certificate authority, and connecting to the application service using the credentials received from the certificate authority.

Also provided is a device that includes an interface unit configured to enable network communications, a memory, and one or more processors coupled to the interface unit and the memory, and configured to: establish an application layer transport layer security (ATLS) connection between the device and a cloud server by sending, from the device, TLS records in transport protocol message bodies (e.g., HTTP message bodies) to the cloud server, the ATLS connection transiting at least one transport layer security (TLS) proxy device, receive, from the cloud server via the ATLS connection, an identifier for a certificate authority, establish a connection with the certificate authority associated with the identifier and, in turn, receive from the certificate authority credentials to access an application service different from the cloud server and the certificate authority, and complete a bootstrapping process of the device by connecting to the application service using the credentials received from the certificate authority.

Example Embodiments

Embodiment described herein introduce Application Layer TLS (ATLS) which allows establishment of a TLS connection between a client and a service across a TLS interception "middlebox." In one implementation, this is achieved by transporting TLS records in hypertext transport protocol (HTTP) message bodies between clients and services (hosted, e.g., on a cloud server). This enables clients and services to establish secure connections using TLS at the application layer, and treat any middleboxes that are intercepting traffic at the network layer as untrusted transport. As will become evident to one of ordinary skill in the art, the mechanisms described herein move the TLS handshake up the OSI stack to the application layer.

More specifically, ATLS leverages TLS software stack application programming interfaces (APIs) which enable applications to unplug network stack and read/write TLS data from/to in-memory byte buffers. In this regard, ATLS can be leveraged by both clients and servers such that TLS records are transported in messages bodies, such as HTTP message bodies. The connection between client and service may also be upgraded to a WebSocket. This allows client-server TLS connection at the application layer over untrusted HTTPS transport.

Reference is now made to FIG. 1, which depicts a network deployment of ATLS according to an example embodiment. As shown, a client 110 communicates with a service (e.g., a server) 150 via an untrusted man-in-the-middle (MITM) (or middlebox) gateway 120 and TLS Terminator 130. More specifically, the client 110 establishes a transport layer TLS connection 182 with the middlebox (client→gateway TLS) comprising a stack including UDP 160, the client→gateway TLS 162, transport 164 (in this example, Constrained Application Protocol (CoAP)), Client→Service TLS 166 and application data 168. The middlebox gateway 120, in turn, opens a transport layer TLS connection 184 with the TLS Terminator 130 deployed in front of the service (M→T TLS). Connection 184 comprises a stack including TCP 161, the M→T TLS 163, HTTP transport 164, client→service TLS 166 and application data 168. TLS Terminator 130 in turn opens a connection to service 150 via stack 186 including TCP 161, HTTP transport 164, client→service TLS 166 and application data 168. The client 110 can ignore any certificate validation errors that are generated by 162 when it connects to the middlebox gateway 120. Certificate validation errors generated by 166 would indicate an actual attack scenario. HTTP messages, for example, are transported over this layer between the client and the service. Application layer TLS messages are thus exchanged via connection 180 inside the transport message bodies (e.g., HTTP message bodies) in order to establish an end-to-end TLS session between the client and the service (Client→Service TLS).

It is noted that the techniques presented herein may be deployed in connection with any cryptographic exchange protocol over any untrusted transport that Man-in-the-Middle (MITM) devices or "middleboxes" may intercept. Examples of application cryptographic exchanges include (but are not necessarily limited to): Transport Layer Security (TLS), the Noise protocol, JavaScript Object Notation (JSON) Web Token (JWT), etc. Examples of transport protocols include: Hyper Text Transfer Protocol Secure (HTTPS)+TLS, HTTP+Transport Control Protocol (TCP), HTTP2, the Quick UDP Internet Connections (QUIC) protocol+TLS, Datagram Transport Layer Security (DTLS), TLS, and IoT transports such as CoAP and Zigbee, among others. Although the most common kind of traffic traversing middleboxes to the Internet is typically HTTP or HTTPS traffic, some browsers such as Google Chrome use QUIC where possible.

Figure 2:
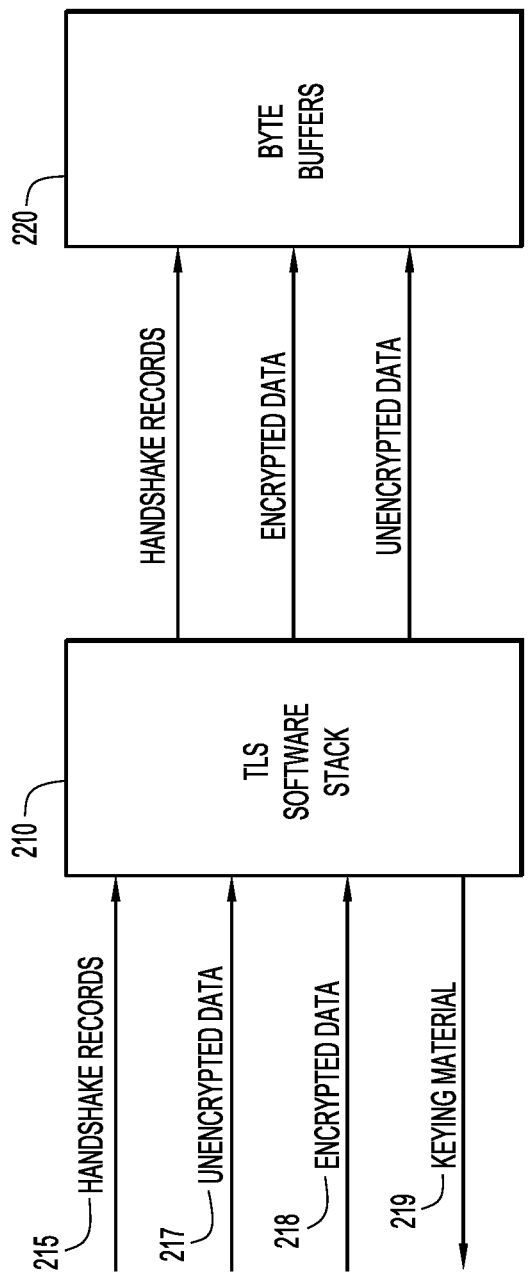
FIG. 2 is a diagram depicting Transport Layer Security (TLS) software stack interfaces exploited by the solution presented herein, according to an example embodiment.

FIG. 2 shows TLS software stack interfaces. As shown in FIG. 2, TLS stack 210 expose Application Programming Interfaces (APIs) that allow applications to inject/extract TLS handshake records 215 from byte buffers 220. The TLS stack 210 also allows applications to encrypt/decrypt application data 217, 218 into/from byte buffers. The bytes can then be exchanged between client 110 and server 150 over any suitable transport. Further, keying material 219 may be acquired via stack 210. Thus, in other words, TLS software stack 210 can be used to 'unplug' the default network socket transport layer and read and write TLS records 215 and other data 217, 218, 219 directly from byte buffers 220. This makes it possible to create application layer TLS sessions, extract the raw TLS record bytes from the bottom of the TLS stack, and transport these bytes over any suitable transport. The TLS software stacks can generate byte streams of full TLS flights which may include multiple TLS records.

Figure 3:
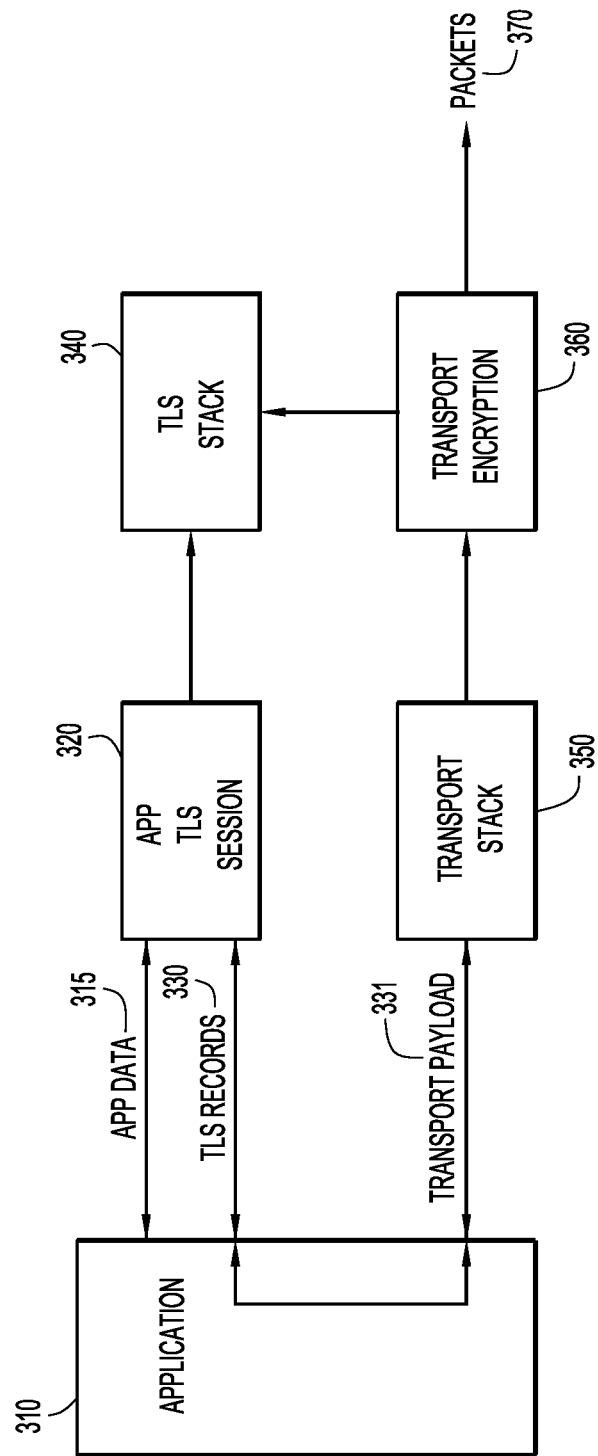
FIG. 3 shows how an application (client or server) can interact directly with an ATLS session to extract raw TLS records, according to an example embodiment.

In an embodiment, the TLS software stack APIs of FIG. 2 enable the architecture depicted in FIG. 3, which shows how an application 310 (client or server) can interact directly with an application ATLS session 320 to extract raw TLS records 330. That is, the application 310 creates and interacts with an application layer TLS session 320 in order to generate and consume the raw TLS records 330 and application data 315. The application 310 transports the raw TLS records 330 inside, e.g., HTTP, message bodies using a (standard HTTP) stack 350. The stack 350 may in turn use an independent communication channel and transport encryption 360 with the same or a different TLS stack 340 (or TCP transport) to communicate packets 370 with its peer. Notably, the application layer TLS session 320 and network layer transport encryption 360 can both leverage a shared, common, TLS software stack 340. This high level architecture is applicable to both clients and services (peers).

Figure 4:
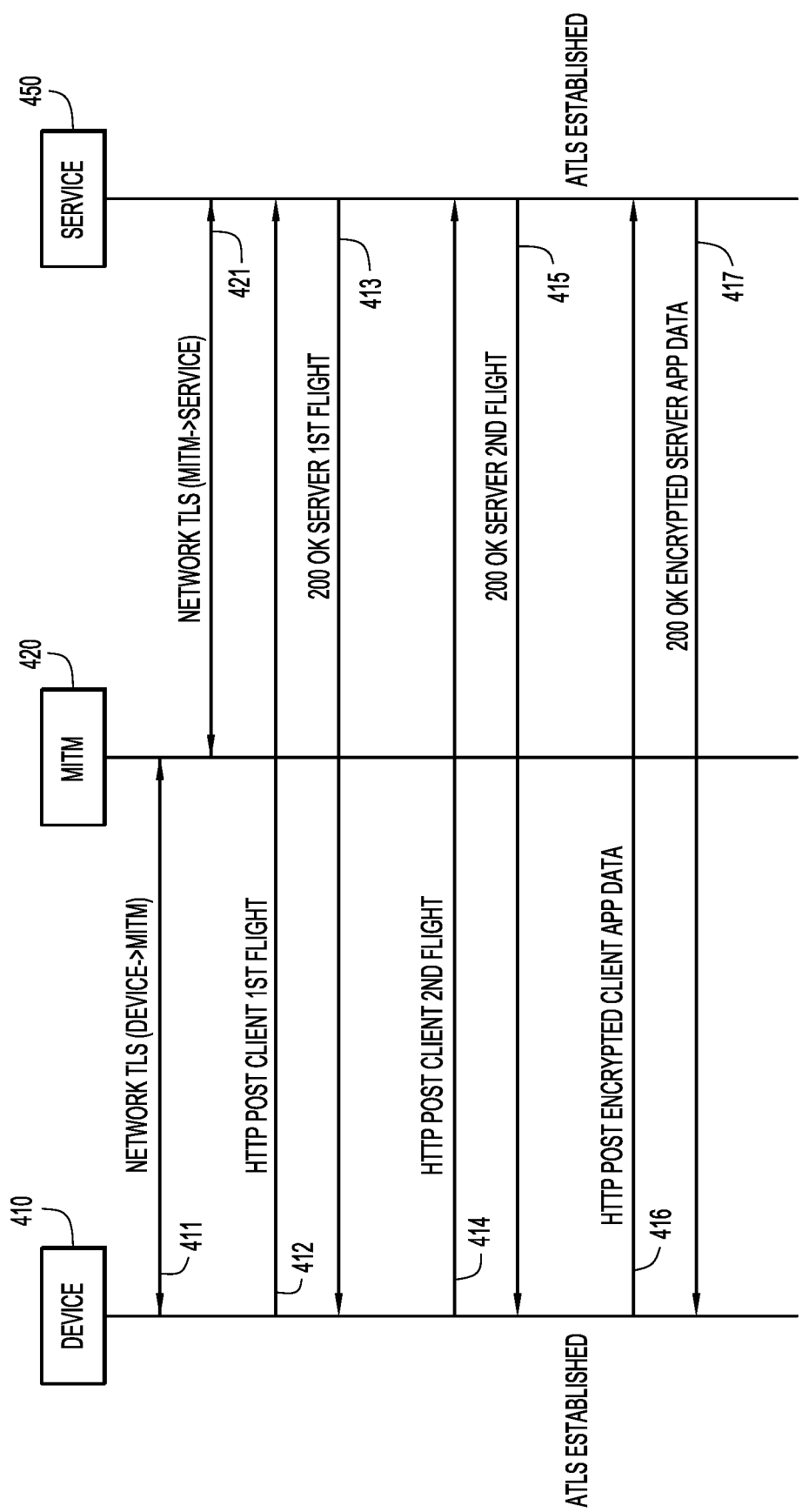
FIG. 4 is a diagram illustrating an example of an ATLS flow that is leveraged by the techniques presented herein, according to an example embodiment.
Figure 5:
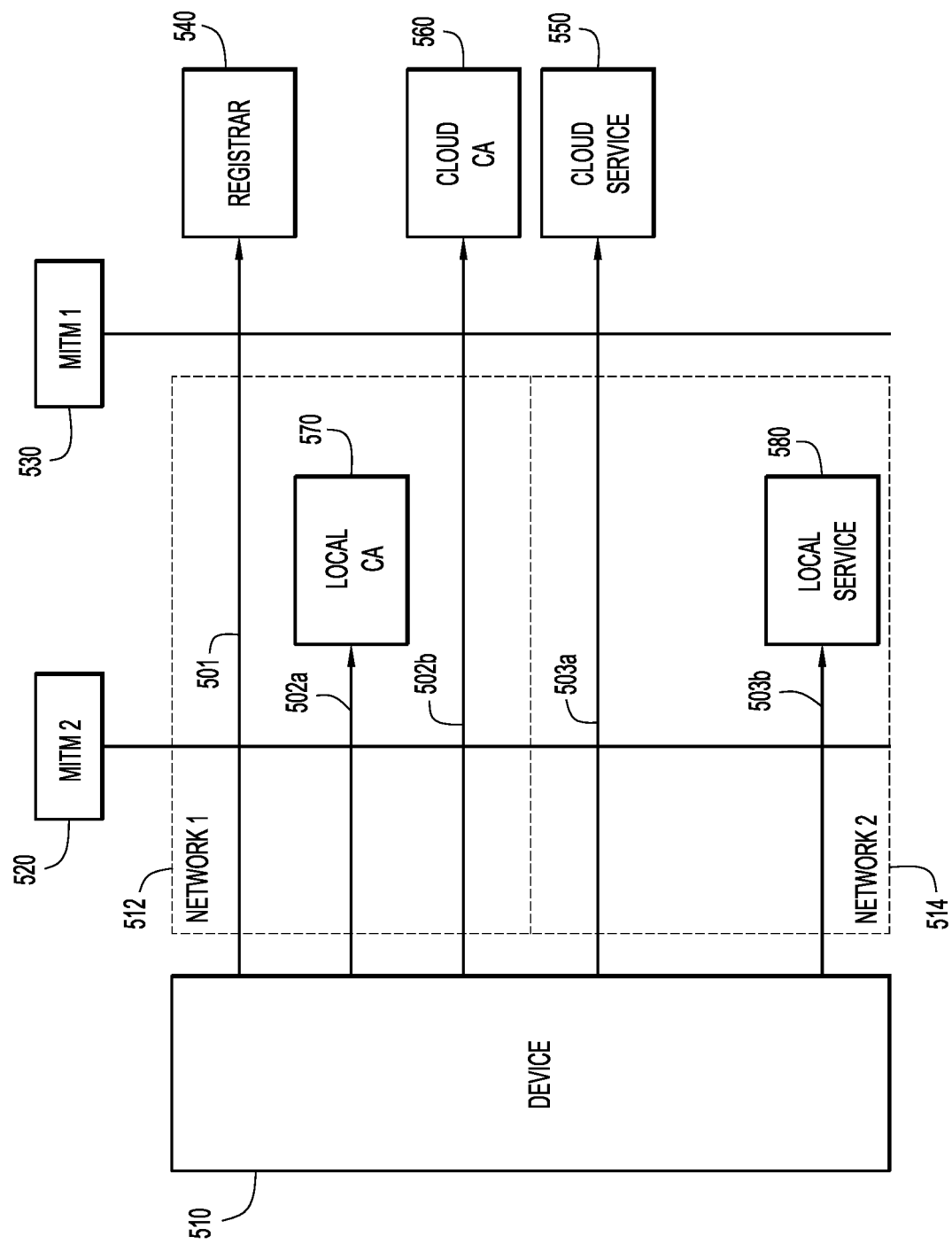
FIG. 5 is a diagram depicting examples of ATLS use cases which are employed by the techniques presented herein, according to an example embodiment.

FIG. 4 illustrates an example of an ATLS flow using HTTP. As shown, a device 410 (e.g., a client device) establishes a network TLS connection 411, 421 via a MITM device 420. At 412, device 410, and in connection with a first flight, sends an HTTP POST to service 450, to which the service 450 replies at 413 with a "200 OK", indicating that the service (server) 450 was able to successfully parse the request and process the TLS records using its TLS software stack. In connection with a second flight, at 414, device 410 sends an HTTP POST to service 450, to which the service 450 replies at 415 with a "200 OK". At this point in the process, ATLS is fully established. Thereafter, at 416, device 410 may send an HTTP POST, at 416, including encrypted application data to which service 450 replies, at 417, with a "200 OK", along with service (server) application data. It is noted that a status code of 200 OK does not necessarily indicate that the TLS connection being negotiated is error-free. That is, alerts produced by TLS will be returned in the encoded TLS records. A 200 OK response simply indicates that the client should provide the records encoded in the response to its TLS stack FIG. 5 illustrates examples of ATLS use cases in accordance with example embodiments. As noted, ATLS enables a client device 510 and server (cloud service 550) to establish a secure mutually authenticated channel over untrusted transport. For example, an untrusted MITM TLS Interception Proxy (e.g., a gateway or MITM2) 520 may sit between client device 510 and server/service 550, and a TLS terminator (e.g., MITM1) 530 may also sit between client device 510 and server/service 550. As noted, ATLS, as described herein, enables servers that sit behind various types of middleboxes to nevertheless to be accessed, and in accordance with the embodiments described herein perform PKI certificate based authentication of connecting clients.

Still referring to FIG. 5, Bootstrapping Remote Secure Key Infrastructures (BRSKI) is a protocol that allows a device, which is bootstrapping on a local domain, to query a default manufacturer service on the internet (called a Registrar 540) and to ask that Registrar 540 what domain and domain Certificate Authorities (CAs) that the device should trust. It is noted that a Registration Authority (RA) may be used in place of a CA. It should be understood that BRSKI relies on establishment of a network layer TLS connection between the device 510 and the Registrar 540 for the purposes of mutual authentication: the client device 510 verifies the Registrar 540 identity using TLS PKI mechanisms, and vice-versa. Conventionally, BRSKI necessitates that the Registrar is directly available on the local network or that any TLS proxy (middlebox) be configured to ignore the communication flows. Operationally this can be difficult in a range of deployments. For example, it is often the case that the TLS proxy either cannot be modified or the network administrators are interested in a 'low management' solution that requires minimal specialized configuration of their network. Collaboration solutions (e.g., video capable end units) are particularly impacted by this deficiency.

The embodiments described herein address the aforementioned issues, and combine ATLS and BRSKI to enable cloud based bootstrapping despite the existence of a TLS proxy (e.g., MITM1 530 and/or MITM2 520). That is, a device 510 can leverage a cloud Registrar service 540 to zero-touch bootstrap against a CA and Application services. The CA can be in the cloud (e.g., cloud CA 560) or in a local domain (local CA 570).

In an embodiment, the device 510 that needs to bootstrap has an Initial Secure Device Identifier (IDevID) also known as Manufacturer Installed Certificate (MIC). The device 510 is configured to automatically enroll against the CA using its IDevID to obtain a Locally Significant Device Identifier (LDevID), also known as Locally Significant Certificate (LSC). However, because MITMs or middleboxes 520, 530 can sit between the device 510 and the cloud Registrar 540, Certificate Authority (CA) 560 and Application services 550, the network layer TLS connection can be broken between the device and all cloud services, preventing the device to successfully bootstrap.

To overcome this potential broken connection problem, the device 510 uses ATLS to establish TLS connections with cloud services across the MITMs. The device can also use its IDevID or LDevID on the ATLS session to verify its identity to services across MITMs. Once the device has an LDevId (or multiple LDevIDs), it can use either LDevID or IDevID, depending on what the service asks for. In other words, the client may use whatever certification the network asks for. For example, the device 510 can use its LDevID to automatically connect to a local domain service 580 or cloud Application services 550. Notably, all of the above can take place without an installer of the device having to enter or configure any information on the device—the installer merely needs to power-up the device. Further, there is nothing preventing the device from using its IDevID to enroll against multiple different CAs and get multiple LDevIDs if desired.

The device 510 leverages cloud Registrar service 540 via connection 501 to facilitate zero-touch enrollment against one or more CAs 560, 570 and zero-touch registration against application services 550, 580. The Registrar service 540 determines the device local domain based on the device's IDevID. As shown, there may be a TLS Interception Proxy/Man In The Middle (MITM 1) 530 between the device 510 and all cloud services 540, 550, 560, but the ATLS mechanism overcomes the likelihood of a connection break. As shown, a Local CA 570 resides in a first network (Network 1) 512 and a Local Service 580 resides in a second network (Network 2) 514.

The illustrated architecture also works if there is an MITM (MITM 2) 520 between the device 510 and all local services 570, 580, although such a deployment configuration may not be as common. The CA (560 or 570) from which the device 510, with its IDevID, obtains its LDevID could be in the cloud (via connection 502b) or in the local domain (via connection 502a). As noted, the device 510 could enroll and obtain multiple LDevIDs from multiple CAs, if desired.

Upon exchanging appropriate credentials, the device 510 can connect to cloud application service 550 via connection 503a and/or to local domain application service 580 via connection 503b.

Depending on network configuration or topology, the device 510 may connect in different ways to, or through, a local domain network during the connection process.

Network 1 512, for example, may allow the device 510 to connect to Registrar 540 on the Internet, and may allow the device 510 to connect to the CA (whether that CA is deployed on the Internet (cloud CA 560) or on the local domain (local CA 570)). Such connections occur before the device 510 has enrolled to obtain an LDevID. The network may grant access to additional services, but this is not required. Further, the network may require that the device have a trusted IDevID prior to granting network access.

Network 2 514, as another example, may allow the device 510 to connect to all required application services 580, 550 on the local domain and internet, respectively. The device 510 will typically have to present an LDevID issued by a trusted CA prior to being granted network access.

Connections may make use of a mutual TLS connection where the client and service use PKI certificates to verify mutual identity and where that connection traverses an MITM, by leveraging ATLS. That is, where there is an MITM between the device 510 and cloud services, this means that, e.g., connections 501, 502b and 503a are ATLS connections. Where there is an MITM between the device 510 and al local domain services, this means that, e.g., connections 502a and 503b are ATLS connections.

A high level flow associated with a cloud CA and both local domain and cloud application Services is as follows, with reference still to FIG. 5.

1. Device 510 establishes ATLS connection 501 with cloud Registrar 540, while traversing MITM1 530. As explained, the device 510 can establish an ATLS connection with the Registrar 540 in the cloud by layering an application layer TLS handshake over an HTTP exchange, which could in turn be transported over either a TCP or TLS network layer connection, i.e., the connection could be ATLS over HTTP over TCP or ATLS over HTTP(S) over TLS. The device 510 uses its manufacturer installed certificate (IDevID) when establishing the ATLS connection to the cloud Registrar 540.

2. Network 1 512 allows the device 510 to connect to the Registrar 540 (and the CA 560 in the next step). Network 1 512 may check that the device 510 has a trusted IDevID issued by a trusted manufacturer.

3. Registrar 540 uses the device's IDevID to lookup a device home domain via some suitable order fulfilment, supply chain, or similar back end service integration. The device 510 and cloud Registrar 540 mutually authenticate each other's identity using PKI certificates presented in the ATLS connection. The cloud Registrar 540 uses the client PKI certificate (e.g., the IDevID) to lookup the domain that owns the client (using sales channel integration or some suitable mechanism). This lookup mechanism is outside the scope of this disclosure and not further discussed herein.

4. Registrar 540 returns an identification of a CA for device 510 to use (i.e., cloud CA 560 in this example) and trust anchor information for the CA. It is also possible that a device enrolls against multiple CAs to obtain multiple identity certifications. The trust anchor information may include trust anchor information for the CA and trust anchor information for the local network domain. This allows the device to trust the CA, and to trust the local network domain, including any MITMs. The cloud Registrar 540 returns domain information including local CA information and any other necessary details to the device 510. The device 510 trusts the information that it receives from the cloud Registrar 540.

5. Device 510 establishes ATLS connection 502b with the cloud CA 560, while traversing MITM 1 530, and uses its IDevID to obtain an LDevID. At this point device 510 may be considered to have completed its bootstrapping as device 510 now has the information/credentials to access a service.

6. The cloud CA 560 can make a policy decision regarding whether to issue the LDevID based on the IDevID presented, and the manufacturer CA used to sign the IDevID.

7. Device 510 establishes ATLS connection 503a with cloud application service 550, while traversing MITM 1 530, and uses its LDevID to gain access, or whatever certification the service asks for.

8. The cloud application service 550 can make a policy decision regarding whether to grant access based on the LDevID presented, and the CA used to sign the LDevID.

9. Device 510 establishes ATLS connection 503b with local domain application service 580, while traversing MITM 2 520, and uses its LDevID to gain access.

10. The local domain application service 580 can make a policy decision regarding whether to grant access based on the LDevID presented, and the CA used to sign the LDevID.

11. Network 2 514 allows the device 510 to connect to application services by checking that the device 510 has a trusted LDevID issued by a trusted CA.

After the device has successfully bootstrapped against the local domain, and can successfully connect to both local domain and cloud application services there are multiple potential behaviors possible. For example, once the device 510 has successfully connected to application services 550, 580 using a suitable IDevID or LDevID certificate, the service 550, 580 may issue to the device 510 a token, or establish a session with the device 510 such that all subsequent access is granted via the session or token, and not by using the certificate. Further, once the device 510 trusts the MITMs 520, 530, the device 510 may fallback to using standard TLS, and not ATLS. Additionally, subsequent flows might use the LDevID credential chain from the local network to fully authenticate the Client→gateway 120 TLS session 120 (FIG. 1) during subsequent (non-bootstrapping) communications with the service 150. This provides a unique multi-secured flow between 182 and 150 that is both authenticated to the local MITM TLS proxy and authenticated to the service 150 or TLS terminator 130.

Figure 6:
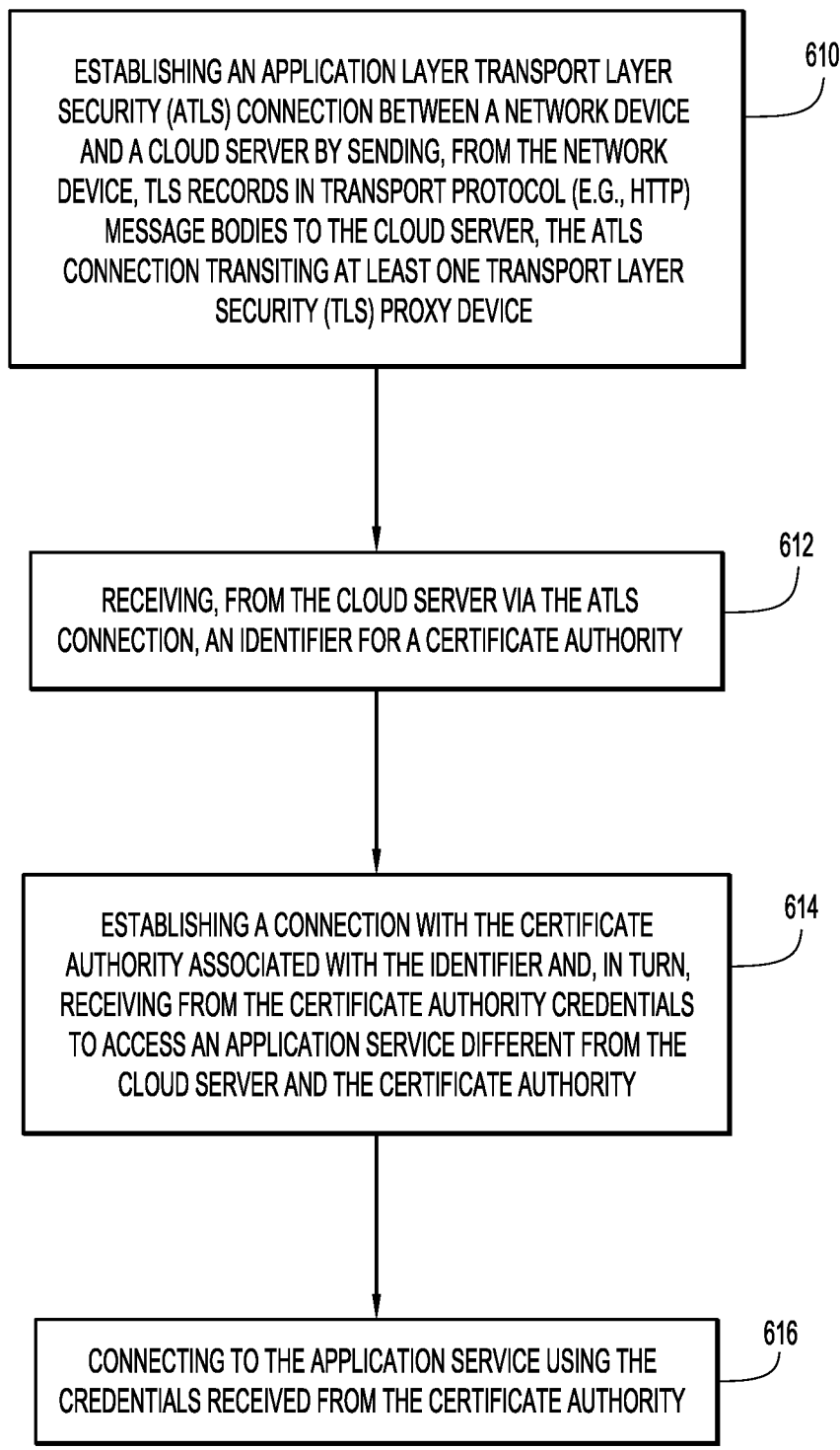
FIG. 6 depicts a series of operations that may be performed by a network device in connection with bootstrapping in a given local domain, according to an example embodiment.

FIG. 6 depicts a series of operations that may be performed by device 510 in connection with bootstrapping in a given local domain. At 610, a network device establishes an application layer transport layer security (ATLS) connection between the network device and a cloud server by sending, from the network device, TLS records in transport protocol message bodies (e.g., HTTP message bodies) to the cloud server, the ATLS connection transiting at least one transport layer security (TLS) proxy device. At 612, the network device receives, from the cloud server via the ATLS connection, an identifier for a certificate authority. At 614, the network device establishes a connection with the certificate authority associated with the identifier and, in turn, receives from the certificate authority credentials to access an application service different from the cloud server and the certificate authority. The network device may be considered to have completed bootstrapping at this point. At 616, the network device connects to the application service using the credentials received from the certificate authority.

As those skilled in the art will appreciate, the embodiments presented herein leverage mechanisms to enable cloud based bootstrapping despite the existence of a TLS proxy. Specifically, a client (device) establishes an ATLS connection with a Registrar in the cloud by layering an application layer TLS handshake over a HTTP exchange, which could in turn be transported over either a TCP or TLS network layer connection, i.e., the connection could be ATLS over HTTP over TCP or ATLS over HTTPS over TLS.

The client uses its manufacturer installed certificate (IDevID) when establishing the ATLS connection to the cloud Registrar. The client and cloud Registrar mutually authenticate each other's identity using PKI certificates presented in the ATLS connection. The cloud Registrar uses the client PKI certificate (e.g., the IDevID) to lookup the domain that owns the client (using sales channel integration using any suitable mechanism). The cloud Registrar then returns domain information including local CA information and any other necessary details to the client, such as trust anchor information, etc. The client trusts the information that it receives from the cloud Registrar.

As noted, the client may, for example, leverage ATLS again to enroll against one or more CAs using its IDevID to obtain one or more LDevIDs, even if there is a TLS proxy between the client and the CA. As another example, the client may use its new LDevID to connect to the local domain and local domain services. This could include using the LDevID to connect to an 802.1x network, using the LDevID to connect to HTTP proxies or connect to MITMs, or using the LDevID to perform multiplex TLS (at the network layer or the application layer using ATLS) against local domain services or services on the internet.

The embodiments described herein provide for a client to validate a service's PKI identity using ATLS and for a service to validate a client's PKI identity using a standard TLS software stack, but operating at the application level and effectively bypassing any network layer TLS middleboxes. The client can use ATLS to enroll against a CA using its IDevID for authentication in order to get an LDevID, while potentially traversing TLS middleboxes. Moreover, the client can use ATLS to connect to a cloud service using its LDevID for authentication in order to access service features, while potentially traversing TLS middleboxes.

These capabilities, combined with the fact that the bootstrap, enroll and service access are all zero-touch for the installer, and further combined with the fact that the client also acquires an LDevID which can be used for 802.1x network authentication are particularly advantageous and unique.

Figure 7:
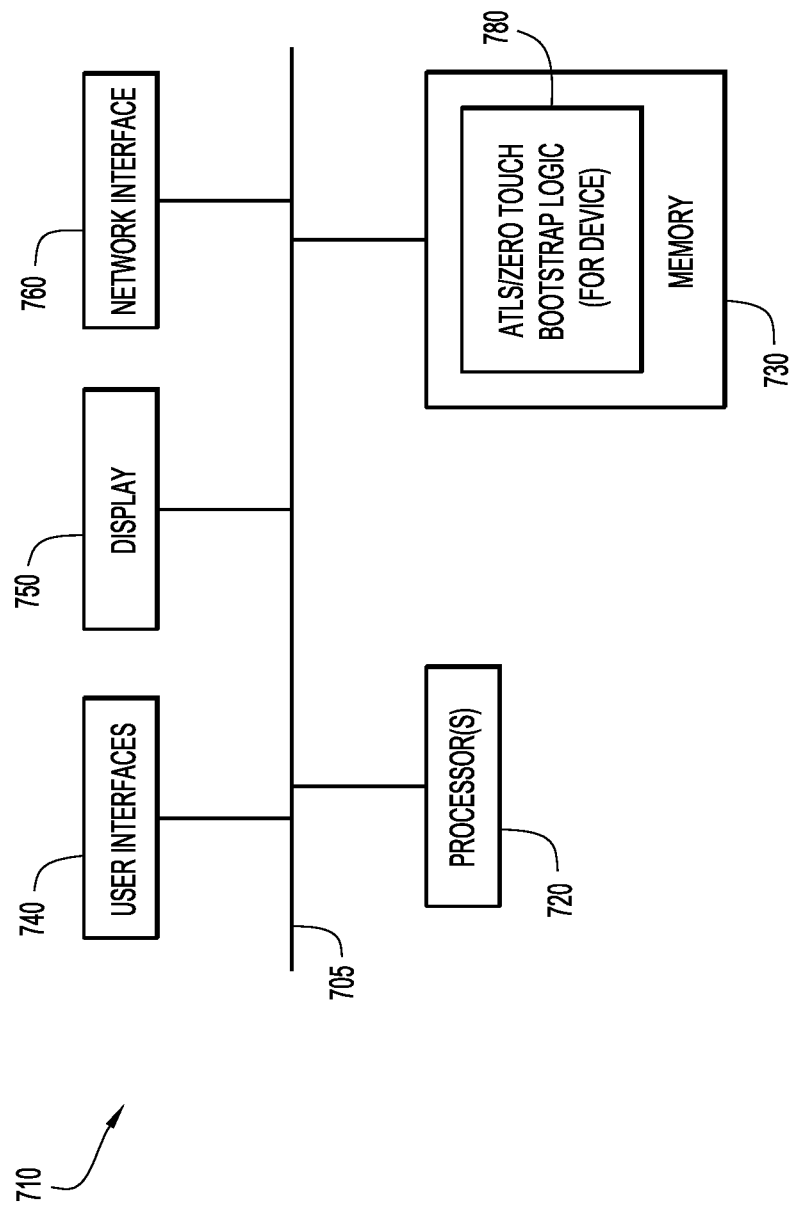
FIG. 7 illustrates a block diagram of a client device configured to participate in the techniques presented herein, according to an example embodiment.

FIG. 7 illustrates a block diagram of a client (device) 710 configured to participate in the techniques presented herein. The client 710 may take on a variety of forms, but for simplicity, FIG. 7 shows that the client includes one or more processors 720, a memory 730, user interfaces 740, a display 750 and a network interface 760, all interconnected via, e.g., a common bus 705.

The processors 720 may comprise, e.g., application specific integrated circuits (ASICs) or configurable logic devices, e.g., simple programmable logic devices (SPLDs), complex programmable logic devices (CPLDs), and field programmable gate arrays (FPGAs), that, in addition to microprocessors and digital signal processors may individually, or collectively, operate as processing circuitry. Such processing circuitry may be located in one device or distributed across multiple devices.

The memory 730 may comprise magnetic disk storage media devices, optical storage media devices, random access memory (RAM) or other dynamic storage device (e.g., dynamic RAM (DRAM), static RAM (SRAM), and synchronous DRAM (SD RAM)), read only memory (ROM) or other static storage device (e.g., programmable ROM (PROM), erasable PROM (EPROM), and electrically erasable PROM (EEPROM)), or other physical/tangible memory storage devices.

User interfaces 740 may include a mouse, keyboard, trackball, or touch screen among other like human-machine interfaces.

Display 750 may be a cathode ray tube (CRT), liquid crystal display (LCD), light emitting diode (LED) display, etc., for displaying information to a computer user.

The network interface 760 enables network connectivity/communication (wired and/or wireless), and might be, e.g., a physical or virtual network interface card (NIC).

Figure 8:
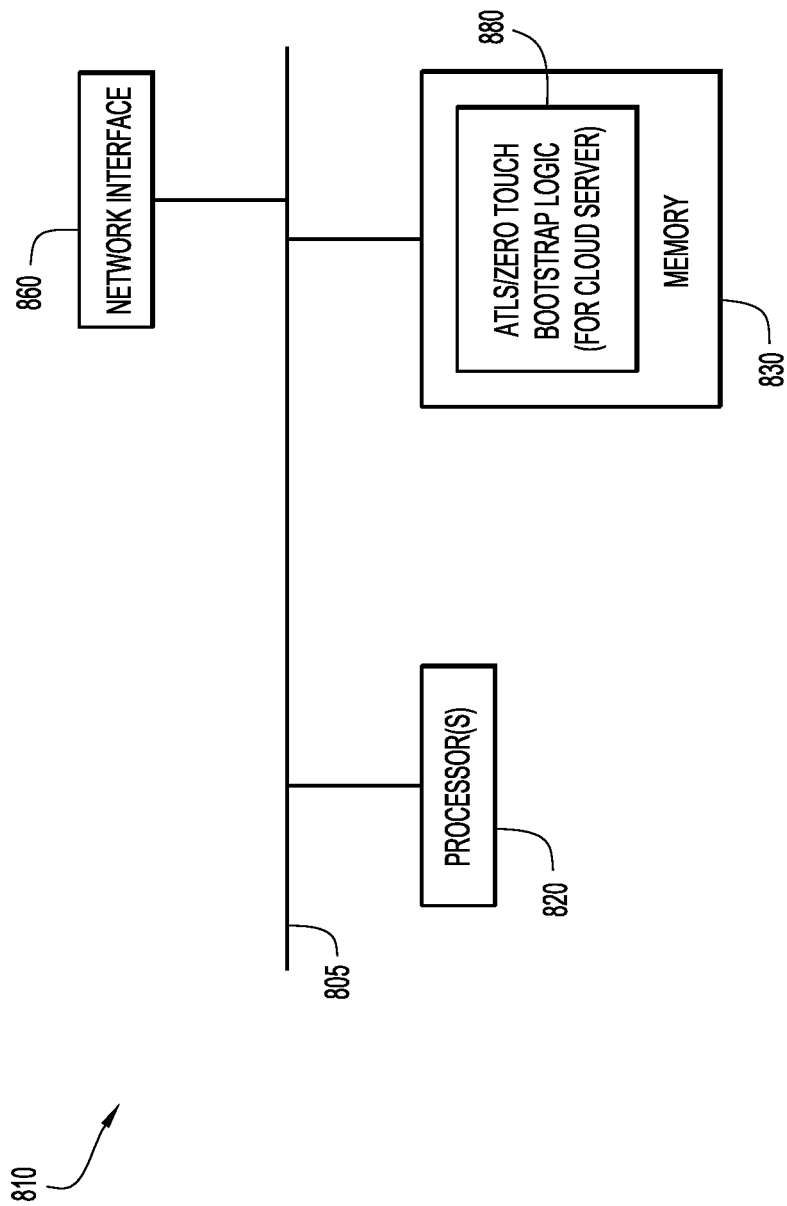
FIG. 8 is a block diagram of other entities, such as a cloud server, that are configured to participate in the techniques presented herein, according to an example embodiment.

The memory 730 may store instructions or logic (software) 780 for ATLS/zero touch bootstrap enabling software to allow the client 710 to perform the operations needed to participate in the techniques described herein. Alternatively, the network interface 760 may be configured to perform these operations. In general, the memory 730 may comprise one or more tangible (non-transitory) computer readable storage media (e.g., a memory device) encoded with software comprising computer executable instructions and when the software is executed, it is operable to perform the operations described herein FIG. 8 illustrates a block diagram of a device (server) 810, such as the Registrar 540, Cloud CA 560, Cloud Service 550, Local CA 570 and Local Service 580, that may be configured to participate in the techniques or operations described herein. As with the client device, the server 810 may include a network interface 860 (like those described above), one or more processors 820 (like those described above) and memory 830 (like that described above) that stores instructions (logic) 880 for device-appropriate functions for zero touch bootstrap enabling software. Logic 880 is configured to, e.g., perform the operations of ATLS handshaking like that shown in, e.g., FIG. 4. And, as above, in general, the memory 830 may comprise one or more tangible (non-transitory) computer readable storage media (e.g., a memory device) encoded with software comprising computer executable instructions and when the software is executed, it is operable to perform the operations described herein.

In summary, in one form, a method is provided. The method includes establishing an application layer transport layer security (ATLS) connection between a network device and a cloud server by sending, from the network device, TLS records in transport protocol message bodies to the cloud server, the ATLS connection transiting at least one transport layer security (TLS) proxy device, receiving, from the cloud server via the ATLS connection, an identifier for a certificate authority, establishing a connection with the certificate authority associated with the identifier and, in turn, receiving from the certificate authority credentials to access an application service different from the cloud server and the certificate authority, and connecting to the application service using the credentials received from the certificate authority.

The method may further include sending by the network device to the cloud server a unique identifier of the network device. The unique identifier may be an Initial Secure Device Identifier (IDevID) or a Manufacturer Installed Certificate (MIC) of the network device.

In the method, the credentials may be a locally significant device identifier (LDevID) or a locally significant certificate (LSC) of the network device. A connection may be thus established with a local domain application service using the LDevID or LSC.

In an accordance with an embodiment, the ATLS connection between the network device and the cloud server may be instantiated as ATLS over hypertext transport protocol (HTTP) over Transmission Control Protocol (TCP). The ATLS connection between the network device and the cloud server may be alternatively instantiated as ATLS over HTTP over TLS.

In accordance with an embodiment, the method includes establishing another application layer transport layer security (ATLS) connection between the network device and another cloud server by sending, from the network device, TLS records in hypertext transport protocol (HTTP) message bodies to the cloud server, the another ATLS connection transiting at least one transport layer security (TLS) proxy device, and receiving, from the another cloud server via the another ATLS connection, another identifier for another certificate authority.

In one implementation, the at least one TLS proxy device comprises a TLS terminating load balancer, and the at least one transport layer security (TLS) proxy device comprises a TLS interception middlebox.

In another embodiment, a device is provided. The device may include an interface unit configured to enable network communications, a memory, and one or more processors coupled to the interface unit and the memory, and configured to establish an application layer transport layer security (ATLS) connection between the device and a cloud server by sending, from the device, TLS records in transport protocol message bodies to the cloud server, the ATLS connection transiting at least one transport layer security (TLS) proxy device, receive, from the cloud server via the ATLS connection, an identifier for a certificate authority, establish a connection with the certificate authority associated with the identifier and, in turn, receive from the certificate authority credentials to access an application service different from the cloud server and the certificate authority, and connect to the application service using the credentials received from the certificate authority.

In an embodiment, the one or more processors may be further configured to send by the device to the cloud server a unique identifier of the device The unique identifier may comprise an Initial Secure Device Identifier (IDevID) or a Manufacturer Installed Certificate (MIC) of the device.

The credentials may comprise a locally significant device identifier (LDevID) or a locally significant certificate (LSC) of the device, and the one or more processors may be further configured to establish a connection with a local domain application service using the LDevID or LSC.

The ATLS connection between the device and the cloud server may be instantiated as ATLS over hypertext transport protocol (HTTP) over Transmission Control Protocol (TCP), or alternatively, the ATLS connection between the device and the cloud server is instantiated as ATLS over HTTP over TLS.

In still another embodiment, a non-transitory tangible computer readable storage media encoded with instructions is provided that, when executed by at least one processor is configured to cause the processor to establish an application layer transport layer security (ATLS) connection between a network device and a cloud server by sending, from the network device, TLS records in transport protocol message bodies to the cloud server, the ATLS connection transiting at least one transport layer security (TLS) proxy device, receive, from the cloud server via the ATLS connection, an identifier for a certificate authority, establish a connection with the certificate authority associated with the identifier and, in turn, receive from the certificate authority credentials to access an application service different from the cloud server and the certificate authority, and connect to the application service using the credentials received from the certificate authority.

In an embodiment, the instructions may be further operable to send by the network device to the cloud server a unique identifier of the network device. The unique identifier comprises an Initial Secure Device Identifier (IDevID) or a Manufacturer Installed Certificate (MIC) of the network device.

The above description is intended by way of example only.

What is claimed is:

1. A method, comprising:
   establishing an application layer transport layer security (ATLS) session between a network device and a cloud server by sending, from the network device, first TLS records, over an application layer transport protocol, to the cloud server, the ATLS session transiting at least one transport layer security (TLS) proxy device;
   receiving, from the cloud server via the ATLS session, an identifier for a certificate authority;
   establishing a connection with the certificate authority associated with the identifier and, in turn, receiving from the certificate authority credentials to access an application service different from the cloud server and the certificate authority; and
   connecting to the application service using the credentials received from the certificate authority,
   wherein the ATLS session between the network device and the cloud server is instantiated as ATLS, using the first TLS records, over HTTP over TLS, using second TLS records, and wherein the first TLS records and the second TLS records use different TLS stacks.

2. The method of claim 1, further comprising sending by the network device to the cloud server a unique identifier of the network device.

3. The method of claim 2, wherein the unique identifier comprises an Initial Secure Device Identifier (IDevID) or a Manufacturer Installed Certificate (MIC) of the network device.

4. The method of claim 1, wherein the credentials comprise a locally significant device identifier (LDevID) or a locally significant certificate (LSC) of the network device.

5. The method of claim 4, further comprising establishing a connection with a local domain application service using the LDevID or LSC.

6. The method of claim 1, wherein the ATLS session between the network device and the cloud server is instantiated as ATLS over hypertext transport protocol (HTTP) over Transmission Control Protocol (TCP).

7. The method of claim 1, further comprising establishing another application layer transport layer security (ATLS) session between the network device and another cloud server by sending, from the network device, TLS records in hypertext transport protocol (HTTP) message bodies to the cloud server, the another ATLS session transiting at least one transport layer security (TLS) proxy device; and
   receiving, from the another cloud server via the another ATLS session, another identifier for another certificate authority.

8. The method of claim 1, wherein the at least one TLS proxy device comprises a TLS terminating load balancer.

9. The method of claim 1, wherein the at least one transport layer security (TLS) proxy device comprises a TLS interception middlebox.

10. A device comprising:
    an interface unit configured to enable network communications;
    a memory; and
    one or more processors coupled to the interface unit and the memory, and configured to:
      establish an application layer transport layer security (ATLS) session between the device and a cloud server by sending, from the device, first TLS records, over an application layer transport protocol, to the cloud server, the ATLS session transiting at least one transport layer security (TLS) proxy device;
      receive, from the cloud server via the ATLS session, an identifier for a certificate authority;
      establish a connection with the certificate authority associated with the identifier and, in turn, receive from the certificate authority credentials to access an application service different from the cloud server and the certificate authority; and
      connect to the application service using the credentials received from the certificate authority,
      wherein the ATLS session between the device and the cloud server is instantiated as ATLS, using the first TLS records, over HTTP over TLS, using second TLS records, and wherein the first TLS records and the second TLS records use different TLS stacks.

11. The device of claim 10, wherein the one or more processors are further configured to send by the device to the cloud server a unique identifier of the device.

12. The device of claim 11, wherein the unique identifier comprises an Initial Secure Device Identifier (IDevID) or a Manufacturer Installed Certificate (MIC) of the device.

13. The device of claim 10, wherein the credentials comprise a locally significant device identifier (LDevID) or a locally significant certificate (LSC) of the device.

14. The device of claim 13, wherein the one or more processors are further configured to establish a connection with a local domain application service using the LDevID or LSC.

15. The device of claim 10, wherein the ATLS session between the device and the cloud server is instantiated as ATLS over hypertext transport protocol (HTTP) over Transmission Control Protocol (TCP).

16. One or more non-transitory computer readable storage media encoded with software comprising computer executable instructions and when the software is executed operable to:
    establish an application layer transport layer security (ATLS) session between a network device and a cloud server by sending, from the network device, first TLS records, over an application layer transport protocol, to the cloud server, the ATLS session transiting at least one transport layer security (TLS) proxy device;
    receive, from the cloud server via the ATLS session, an identifier for a certificate authority;
    establish a connection with the certificate authority associated with the identifier and, in turn, receive from the certificate authority credentials to access an application service different from the cloud server and the certificate authority; and
    connect to the application service using the credentials received from the certificate authority,
    wherein the ATLS session between the network device and the cloud server is instantiated as ATLS, using the first TLS records, over HTTP over TLS, using second TLS records, and wherein the first TLS records and the second TLS records use different TLS stacks.

17. The one or more non-transitory computer readable storage media of claim 16, wherein the instructions are further operable to send by the network device to the cloud server a unique identifier of the network device.

18. The one or more non-transitory computer readable storage media of claim 17, wherein the unique identifier comprises an Initial Secure Device Identifier (IDevID) or a Manufacturer Installed Certificate (MIC) of the network device.

* * * * *